US012790956B2

(12) United States Patent
Zhou et al.

(10) Patent No.: US 12,790,956 B2
(45) Date of Patent: *Nov. 10, 2026

(54) METHOD AND INTEGRALLY BLADED ROTOR FOR BLADE OFF TESTING

(71) Applicant: Pratt & Whitney Canada Corp., Longueuil (CA)

(72) Inventors: Yongsheng Zhou, Oakville (CA); Brigitte Toljagic, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 87 days.

This patent is subject to a terminal disclaimer.

(21) Appl. No.: 18/738,918

(22) Filed: Jun. 10, 2024

(65) Prior Publication Data

US 2024/0328329 A1 Oct. 3, 2024

Related U.S. Application Data

(63) Continuation of application No. 17/971,183, filed on Oct. 21, 2022, now Pat. No. 12,006,830.

(51) Int. Cl.

| | |
|---|---|
| ***F01D 21/00*** | (2006.01) |
| ***F01D 5/34*** | (2006.01) |
| ***F01D 21/04*** | (2006.01) |
| ***G01M 15/14*** | (2006.01) |

(52) U.S. Cl.

CPC ............. *F01D 21/003* (2013.01); *F01D 5/34* (2013.01); *F01D 21/045* (2013.01); *G01M 15/14* (2013.01); *F05D 2260/83* (2013.01)

(58) Field of Classification Search

CPC ......... F01D 5/34; F01D 21/003; G01M 15/14

See application file for complete search history.

(56) References Cited

U.S. PATENT DOCUMENTS

| | | | |
|---|---|---|---|
| 8,864,465 | B2 | 10/2014 | Viegas |
| 10,113,442 | B2 | 10/2018 | Hall |
| 10,260,512 | B2 | 4/2019 | Hall |
| 10,690,000 | B1 | 6/2020 | Alecu |
| 10,774,679 | B2 | 9/2020 | Cotten |
| 2010/0158693 | A1 | 6/2010 | Viegas |
| 2012/0034081 | A1 | 2/2012 | Ross |

(Continued)

FOREIGN PATENT DOCUMENTS

| | | |
|---|---|---|
| CN | 107202681 B | 4/2020 |
| CN | 110030042 B | 9/2021 |

(Continued)

*Primary Examiner* — Eric S. McCall

(74) *Attorney, Agent, or Firm* — Getz Balich LLC

(57) ABSTRACT

An integrally bladed rotor (IBR) for a gas turbine engine is provided. The IBR includes a hub, rotor blades that include a test blade, and at least one heating element. Each rotor blade has an airfoil with leading and trailing edges, suction side and pressure side surfaces, and a base end. The airfoil of the test blade includes at least one slot defining a void in the airfoil. The slot extends a lengthwise distance into the airfoil along a direction generally between the leading and trailing edges of the airfoil and terminates at a slot end surface. The airfoil includes at least one internal cavity extending lengthwise from the slot end surface. The heating element is disposed in the internal cavity and selectively produces thermal energy sufficient to heat the airfoil material proximate the internal cavity to a temperature at which the airfoil mechanical strength properties are decreased.

20 Claims, 6 Drawing Sheets

(56) References Cited

U.S. PATENT DOCUMENTS

| | | | |
|---|---|---|---|
| 2015/0330246 | A1 | 11/2015 | Whitehead |
| 2018/0016934 | A1 | 1/2018 | Hall |
| 2018/0017065 | A1 | 1/2018 | Hall |
| 2020/0123910 | A1 | 4/2020 | Cotten |
| 2022/0018263 | A1 | 1/2022 | Seo |
| 2022/0170372 | A1 | 6/2022 | Senoo |
| 2022/0349389 | A1 | 11/2022 | Spandley |
| 2022/0397098 | A1 | 12/2022 | Klümper |
| 2022/0412320 | A1 | 12/2022 | Gutierrez Ardanaz |

FOREIGN PATENT DOCUMENTS

| | | | |
|---|---|---|---|
| CN | 214408048 | U | 10/2021 |
| CN | 115127823 | A | 9/2022 |
| FR | 3042536 | B1 | 11/2017 |

METHOD AND INTEGRALLY BLADED ROTOR FOR BLADE OFF TESTING

This application is a continuation of U.S. patent application Ser. No. 17/971,183 filed Oct. 21, 2022 which is hereby incorporated herein by reference in its entirety.

BACKGROUND OF THE INVENTION

1. Technical Field

The present disclosure relates gas turbine engine integrally bladed rotors in general and to integrally bladed rotors modifying for certification testing in particular.

2. Background Information

Blade off testing is a specific form of air safety testing required by various regulatory entities such as the Federal Aviation Administration (FAA), the European Union Aviation Safety Agency (EASA), Transport Canada, and the like. Blade off testing is used as part of the gas turbine engine safety performance certification. Blade off testing includes a deliberate liberation of a rotor blade while the engine is under power so that the consequences of the liberated blade ("blade off") can be determined. More specifically, blade off tests are used to ensure that an engine can survive a rotor blade (e.g., a fan blade, or a compressor blade, or a turbine blade) breaking off within the engine without fragments being thrown through the outside enclosure of the engine, creating an uncontained engine failure. The specific requirements of the blade off testing can vary between regulatory entities.

Blade off testing is well known. There are several different known techniques for liberating a rotor blade, such as an explosive liberation, or thermal degradation of adhesive disposed in slots cut in a rotor blade, and the like. A key aspect of blade testing is liberating a rotor blade at a predetermined position on the blade under predetermined conditions.

What is needed is a method and IBR configured for blade off testing that is consistent and one that produces accurate results.

SUMMARY

According to an aspect of the present disclosure, an integrally bladed rotor for a gas turbine engine is provided. The integrally bladed rotor is configured for use in blade off testing. The integrally bladed rotor includes a hub, a plurality of rotor blades, and at least one heating element. The hub has a forward end, an aft end, a circumferentially extending exterior surface disposed between the forward and aft ends. The rotor blades are integrally attached to the hub and circumferentially spaced around the hub. The rotor blades includes a test blade. Each rotor blade extends radially out from the hub exterior surface, and each has an airfoil with a leading edge, a trailing edge, a suction side surface, a pressure side surface, a base end, and a width extending between the suction side surface and the pressure side surface. Each airfoil is comprised of an airfoil material having one or more mechanical strength properties. The airfoil of the test blade includes at least one slot defining a void in the airfoil. The at least one slot extends a lengthwise distance into the airfoil along a direction generally between the leading and trailing edges of the airfoil. The at least one slot terminates at a slot end surface. The airfoil includes at least one internal cavity extending lengthwise from the slot end surface. The at least one heating element is disposed in the at least one internal cavity. The at least one heating element is configured to selectively produce an amount of thermal energy sufficient to heat the airfoil material proximate the internal cavity from a first temperature to a second temperature and at the second temperature the one or more mechanical strength properties of the airfoil material proximate the internal cavity are decreased.

In any of the aspects or embodiments described above and herein, at the second temperature the one or more mechanical strength properties of the airfoil material proximate the internal cavity are decreased to a point where the airfoil material proximate the internal cavity will fail during a blade off test.

In any of the aspects or embodiments described above and herein, the at least one heat element may be electrically powered.

In any of the aspects or embodiments described above and herein, the at least one heat element may be an exothermic material.

In any of the aspects or embodiments described above and herein, the at least one slot may be a leading edge slot (LE slot) extending a first lengthwise distance into the airfoil from the leading edge toward the trailing edge, the LE slot terminating at a leading edge slot end surface.

In any of the aspects or embodiments described above and herein, the at least one slot may include a trailing edge slot (TE slot) extending a second lengthwise distance into the airfoil from the trailing edge toward the leading edge, the TE slot terminating at a trailing edge slot end surface.

In any of the aspects or embodiments described above and herein, the at least one internal cavity may extend lengthwise between the LE slot end surface and the TE slot end surface.

In any of the aspects or embodiments described above and herein, the integrally bladed rotor may include at least one lateral cavity disposed adjacent and substantially lengthwise aligned with the at least one internal cavity, wherein the width of the airfoil is decreased at the at least one lateral cavity.

In any of the aspects or embodiments described above and herein, the at least one lateral cavity may include a first lateral cavity disposed on a first circumferential side of the airfoil and a second lateral cavity disposed on a second circumferential side of the airfoil, wherein the first circumferential side of the airfoil is opposite the second circumferential side of the airfoil.

In any of the aspects or embodiments described above and herein, the first lateral cavity and the second lateral cavity may be disposed in a portion of the airfoil in which the at least one internal cavity is disposed and the first lateral cavity and the second lateral cavity are spanwise aligned with the at least one internal cavity.

In any of the aspects or embodiments described above and herein, the at least one slot may be a trailing edge slot (TE slot) extending a first lengthwise distance into the airfoil from the trailing edge toward the leading edge, the TE slot terminating at a trailing edge slot end surface.

In any of the aspects or embodiments described above and herein, the at least one slot may include a leading edge slot (LE slot) extending a first lengthwise distance into the airfoil from the leading edge toward the trailing edge, the LE slot terminating at a leading edge slot end surface, a trailing edge slot (TE slot) extending a second lengthwise distance into the airfoil from the trailing edge toward the leading edge, the TE slot terminating at a trailing edge slot end surface, and an interior slot disposed in the airfoil between the LE slot and the TE slot, the interior slot separated from the LE slot by a first airfoil portion, and the interior slot separated from the TE slot by a second airfoil portion, and wherein the at least one internal cavity includes a first internal cavity disposed in the first airfoil portion extending lengthwise from the leading edge slot end surface and a second internal cavity disposed in the second airfoil portion extending lengthwise from the trailing edge slot end surface, and wherein at least one heating element includes a first heating element disposed within the first internal cavity and a second heating element disposed within the second internal cavity.

In any of the aspects or embodiments described above and herein, the integrally bladed rotor may be configured for use in a compressor section or a fan section of the gas turbine engine.

According to another aspect of the present disclosure, a method for performing blade off testing on an integrally bladed rotor for a gas turbine engine is provided. The method includes: a) providing an integrally bladed rotor having: (1) a hub having a forward end, an aft end, a circumferentially extending exterior surface disposed between the forward end and the aft end; (2) a plurality of rotor blades integrally attached to the hub and circumferentially spaced around the hub, the plurality of rotor blades including a test blade, each rotor blade of the plurality of rotor blades extending radially out from the hub exterior surface, and each rotor blade of the plurality of rotor blades having an airfoil with a leading edge, a trailing edge, a suction side surface, a pressure side surface, and a base end, and a width extending between the suction side surface and the pressure side surface, and each airfoil comprised of an airfoil material having one or more mechanical strength properties; wherein the airfoil of the test blade includes at least one slot defining a void in the airfoil, the at least one slot extending a lengthwise distance into the airfoil along a direction generally between the leading edge and trailing edge of the airfoil, the at least one slot terminating at a slot end surface, and at least one internal cavity extending lengthwise from the slot end surface; b) disposing at least one heating element disposed in the at least one internal cavity, wherein the at least one heating element is configured to selectively produce an amount of thermal energy sufficient to heat the airfoil material proximate the internal cavity from a first temperature to a second temperature and at the second temperature the one or more mechanical strength properties of the airfoil material proximate the internal cavity are decreased; c) operating the gas turbine engine to test operating conditions; and d) selectively operating the at least one heating element to produce the amount of thermal energy sufficient to heat the airfoil material proximate the internal cavity from the first temperature to the second temperature to cause the test blade to be liberated from the integrally bladed rotor.

In any of the aspects or embodiments described above and herein, at the second temperature the one or more mechanical strength properties of the airfoil material proximate the internal cavity are decreased to a point where the airfoil material proximate the internal cavity will fail during a blade off test.

In any of the aspects or embodiments described above and herein, the at least one slot may include a leading edge slot (LE slot) extending a first lengthwise distance into the airfoil from the leading edge toward the trailing edge, the LE slot terminating at a leading edge slot end surface, and a trailing edge slot (TE slot) extending a second lengthwise distance into the airfoil from the trailing edge toward the leading edge, the TE slot terminating at a trailing edge slot end surface.

According to another aspect of the present disclosure, an integrally bladed rotor for a gas turbine engine is provided that is configured for use in blade off testing. The integrally bladed rotor includes a hub, a plurality of rotor blades, and a plurality of heating elements. The hub has a forward end, an aft end, a circumferentially extending exterior surface disposed between the forward and aft ends. The plurality of rotor blades is integrally attached to the hub and circumferentially spaced around the hub. The rotor blades include a test blade. Each rotor blade extends radially out from the hub exterior surface. Each rotor blade has an airfoil with a leading edge, a trailing edge, a suction side surface, a pressure side surface, and a base end, and a width extending between the suction side and the pressure side surfaces, and each airfoil comprises an airfoil material having one or more mechanical strength properties. The airfoil of the test blade includes a plurality of internal passages disposed in the airfoil proximate the base end. The internal passages extend between the suction side and pressure side surfaces. Each heating element is disposed in a respective one of the internal passages. Each heating element is configured to selectively produce an amount of thermal energy sufficient to heat the airfoil material proximate the respective internal passage from a first temperature to a second temperature and at the second temperature the one or more mechanical strength properties of the airfoil material proximate the internal cavity are decreased.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

The present disclosure is directed to an integrally bladed rotor (IBR) configured for performing rotor blade "blade-off" testing for certification purposes, and to a method for performing rotor blade "blade-off" testing for certification purposes.

Figure 1:
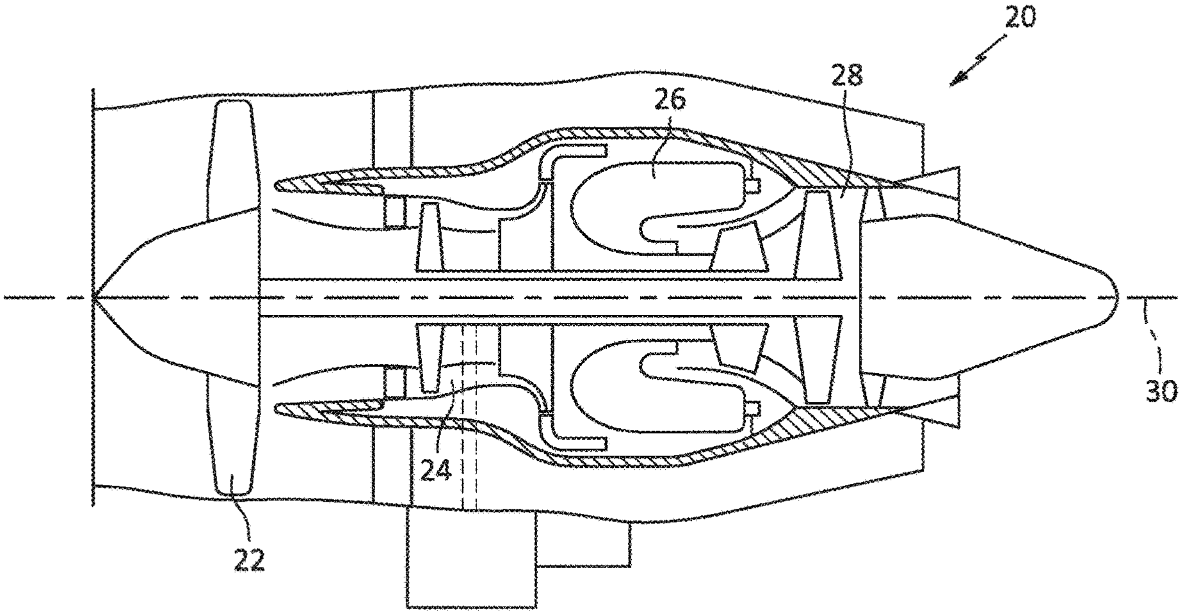
FIG. 1 is a diagrammatic sectional view of a gas turbine engine.

FIG. 1 illustrates a gas turbine engine 20 of a type preferably provided for use in subsonic flight, generally comprising in serial flow communication a fan 22 through which ambient air is propelled, a compressor section 24 for pressurizing the air, a combustor 26 in which the compressed air is mixed with fuel and ignited for generating an annular stream of hot combustion gases, and a turbine section 28 for extracting energy from the combustion gases. The gas turbine engine 20 example shown in FIG. 1 is a two-spool turbofan rotational about a rotational axis 30. The present disclosure is not limited to blade testing with any particular gas turbine engine configuration.

A gas turbine engine 20 includes a number of different rotor stages; e.g., one or more fan blade rotor stages, compressor rotor blade stages, and turbine rotor blade stages. Each rotor stage is configured for rotational movement in the gas turbine engine 20. Fan and compressor rotor stages are configured to be driven via a shaft or a gear arrangement and turbine stages are configured to be driven by a core gas flow passing (e.g., axially) within the engine 20.

Figure 2:
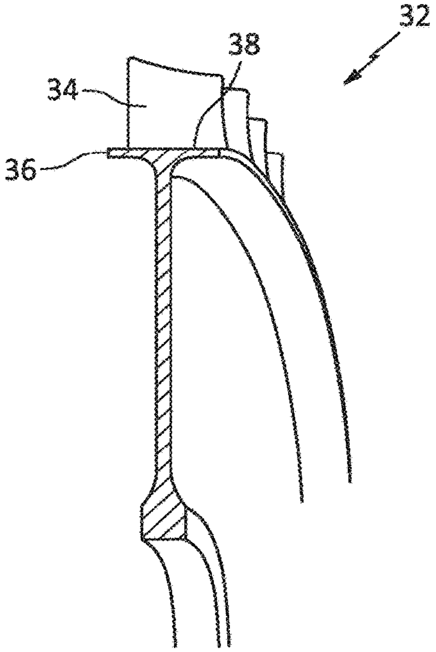
FIG. 2 is a diagrammatic partial perspective view of an integrally bladed rotor.

Referring to FIG. 2, each rotor stage 32 includes a plurality of rotor blades 34 extending out (generally in a radial direction) from a hub 36. The rotor blades 34 are spaced apart from one another around the circumference of the hub 36, typically uniform spaced. It should also be noted that the terms "radial" and "circumferential" are used herein with respect to the rotational axis 30 of the gas turbine engine 20. In some embodiments, rotor blades 34 may be permanently attached to the hub 36 and may be integral with the hub 36. Rotor stages of this type are often referred to as "integrally bladed rotors" or "IBRs" or "blisks" (hereinafter referred to as an "IBR 32"). FIG. 2 diagrammatically illustrates an IBR 32. An IBR 32 may be formed by permanently attaching the rotor blades 34 to the hub 36 (e.g., by weldment or other attachment process), or the entirety of the IBR 32 may be machined from a unitary material. In an IBR 32, the hub 36 extends circumferentially between adjacent rotor blades 34. The exterior surface 38 of the IBR hub 36 between adjacent rotor blades 34 defines (at least in part) an inner gas path surface for the rotor stage.

Figure 3:
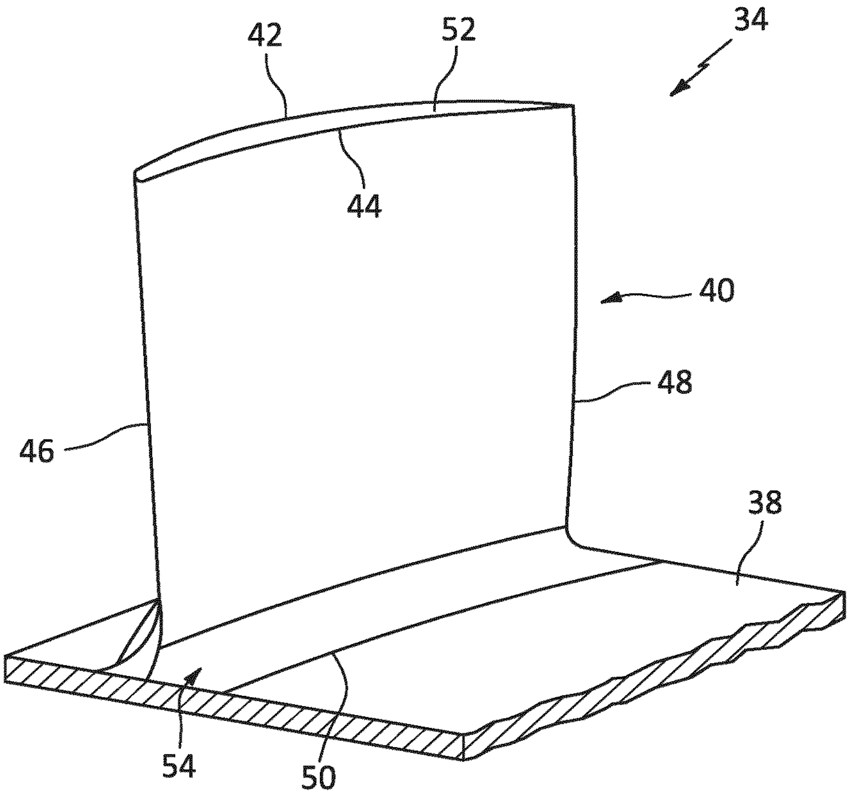
FIG. 3 is a diagrammatic perspective view of a rotor blade portion of an integrally bladed rotor.

Referring to FIG. 3, a rotor blade 34 typically has an airfoil 40 shaped body having a suction side surface 42, a pressure side surface 44, a leading edge 46, a trailing edge 48, a base end 50, and a blade tip 52. The airfoil 40 shaped body may be described as having a chord length extending between the leading edge 46 and the trailing edge 48, and a span extending between the base end 50 and the blade tip 52. The chord is a straight line that extends between the leading edge 46 and the trailing edge 48. The airfoil 40 may also be described as having a camber line that extends between the leading edge 46 and the trailing edge 48, and intersects the chord at the leading edge 46 and the trailing edge 48. The camber line is disposed equidistant between the suction side surface 42 and the pressure side surface 44. The terms "forward" and "aft" as used herein refer to axial orientation. For example, the leading edge 46 of a rotor blade 34 encounters air/core gas passing through a gas turbine engine 20 before the same air/core gas encounters the trailing edge 48 of the same rotor blade 34. When disposed within an engine 20, the leading edge 46 of a rotor blade 34 may be described as being "forward" of the trailing edge 48, and conversely the trailing edge 48 of a rotor blade 34 may be described as being "aft" of the leading edge 46. In similar fashion, the IBR hub 36 may be described as having a forward end proximate the leading edge 46 of the rotor blades 34 and an aft end proximate the trailing edge 48 of the rotor blades 34.

In some embodiments, a rotor blade 34 may have a solid configuration throughout its entirety; i.e., continuous material between the suction side surface 42 and the pressure side surface 44, with no internal voids. In some embodiments, a portion of a rotor blade 34 may have a solid configuration and may have a portion that has internal voids. For example, a rotor blade 34 may have a portion with a solid configuration (e.g., proximate the base region of the rotor blade 34) and a portion that includes one or more internal voids (e.g., in the airfoil 40 above the base end 50) to decrease the weight of the rotor blade 34. An IBR rotor blade 34 typically transitions from a filleted region 54 into the airfoil 40 portion of the rotor blade 34. The filleted region 54 typically includes fillets disposed on each side of the airfoil 40. The respective fillets are solid and increase the thickness of the rotor blade 34 proximate the intersection of the airfoil 40 and the hub 36. The respective fillets may be configured to increase the mechanical strength of the rotor blade 34 at the intersection of the airfoil 40 and the hub 36, eliminate or reduce stress concentrations that may be present at the intersection of the airfoil 40 and the hub 36 absent the fillets, and to produce desirable air flow surfaces.

Referring to FIGS. 2-8A, an aspect of the present disclosure is directed to an IBR 32 having a plurality of rotor blades 34 extending out from a hub 36. At least one of the rotor blades 34 (i.e., a "test blade 34") is configured to be purposefully liberated during a blade-off certification test. In some embodiments, the test blade 34 may include one or both of a leading edge slot (LE slot 56) and a trailing edge slot (TE slot 58). The LE slot 56 and the TE slot 58 are generally spanwise aligned with one another. The LE slot 56 and TE slot 58 may be disposed on the airfoil 40 at a variety of different spanwise positions, but are typically disposed proximate the base end of the airfoil 40. Many blade off certification tests require at least eighty percent (80%) of the blade to be liberated. The LE slot 56 and TE slot 58 are typically disposed on the airfoil 40 at a spanwise position to ensure at least eighty percent (80%) of the blade 34 is liberated during certification testing.

Figure 4:
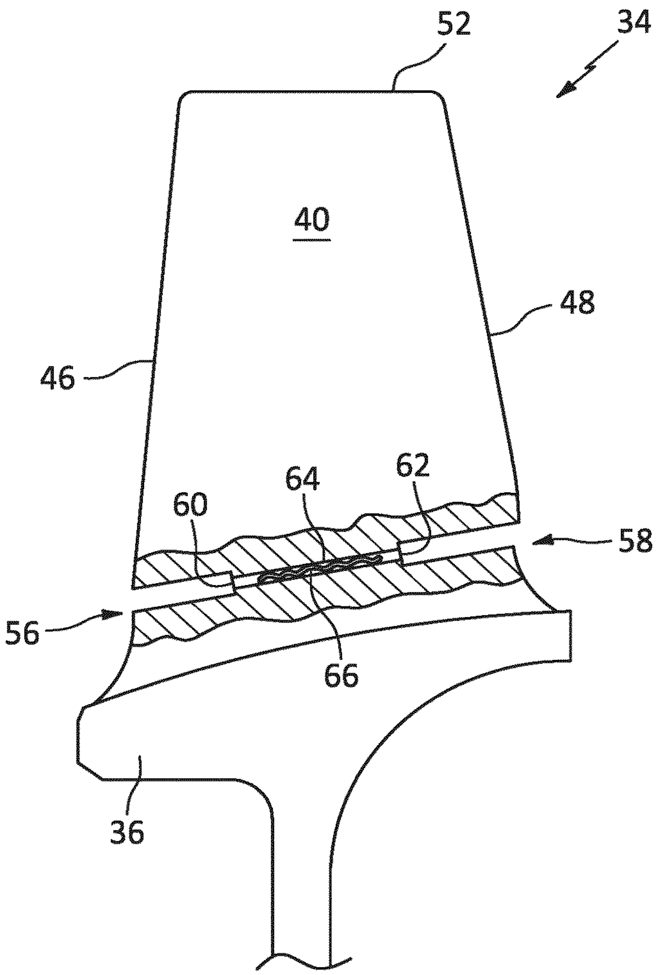
FIG. 4 is a diagrammatic planar side view of a rotor blade portion of an integrally bladed rotor illustrating an embodiment of the present disclosure.
Figure 5:
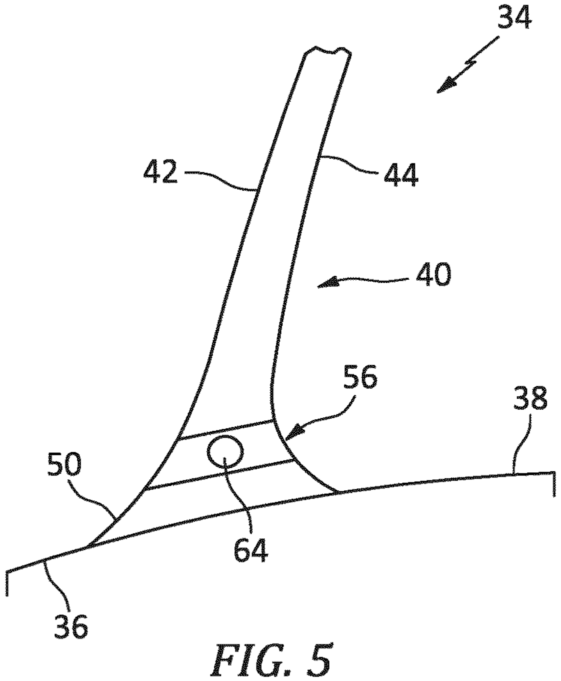
FIG. 5 is a diagrammatic planar front view of a rotor blade portion of an integrally bladed rotor illustrating an embodiment of the present disclosure.

Referring to FIGS. 4 and 5, the LE slot 56 is a void formed in the test blade airfoil 40 disposed at the leading edge 46 of the airfoil 40 and extending a distance aft into the airfoil 40 towards the trailing edge 48. The LE slot 56 is "open" at the leading edge 46 (i.e., the LE slot 56 creates a discontinuity at the leading edge 46) and extends between the suction side surface 42 and pressure side surface 44 of the airfoil 40. The LE slot 56 is devoid of the material that forms the airfoil 40. The LE slot 56 may be described as having a chordwise length, a width (i.e., the distance between the suction side and pressure side surfaces 42, 44 of the airfoil 40), and a spanwise extending height. The length of the LE slot 56 extends from the leading edge 46 to an LE slot end surface 60. In some embodiments, the height of the LE slot 56 may be lengthwise uniform (e.g., as diagrammatically shown in FIG. 4), but a uniform LE slot 56 height is not required. The height of the LE slot 56 extends between a top LE slot surface and a bottom LE slot surface. The top and bottom LE slot surfaces may be oriented perpendicular to the suction side surface 42, or the pressure side surface 44, or both, but a perpendicular orientation is not required.

The TE slot 58 is a void formed in the test blade airfoil 40 disposed at the trailing edge 48 of the airfoil 40 and extending a distance forward into the airfoil 40 towards the leading edge 46. The TE slot 58 is "open" at the trailing edge 48 (i.e., the TE slot 58 creates a discontinuity at the trailing edge 48) and extends between the suction side surface 42 and pressure side surface 44 of the airfoil 40. The TE slot 58 is devoid of the material that forms the airfoil 40. The TE slot 58 may be described as having a chordwise length, a width (i.e., the distance between the suction side and pressure side surfaces 42, 44 of the airfoil 40), and a spanwise extending height. The length of the TE slot 58 extends from the trailing edge 48 to a TE slot end surface 62. In some embodiments, the height of the TE slot 58 may be lengthwise uniform (e.g., as diagrammatically shown in FIG. 4), but a uniform TE slot 58 height is not required. The height of the TE slot 58 extends between a top TE slot surface and a bottom TE slot surface. The top and bottom TE slot surfaces may be oriented perpendicular to the suction side surface 42, or the pressure side surface 44, or both, but a perpendicular orientation is not required. The TE slot 58 and the LE slot 56 may have the same or similar configurations, or they may have configurations that differ from one another.

The test blade further includes at least one internal cavity 64 disposed within the airfoil 40. The internal cavity 64 has a lengthwise axis that extends in a direction between the leading edge 46 and the trailing edge 48. The internal cavity 64 (and its lengthwise axis) may extend lengthwise through a section of the airfoil 40 along a straight line, or may travel along an arcuate path; e.g., an arcuate path that generally follows the camber line of the airfoil 40. In those present disclosure embodiments that include only a LE slot 56, the internal cavity 64 begins at the LE slot end surface 60 (i.e., is open at the LE slot end surface 60) and extends aft toward the trailing edge 48. In these embodiments, the internal cavity 64 may extend the entire chordwise length of the airfoil 40 to the trailing edge 48 (i.e., open at the trailing edge 48), or only a portion of that distance. In those present disclosure embodiments that include only a TE slot 58, the internal cavity 64 begins at the TE slot end surface 62 (i.e., is open at the TE slot end surface 62) and extends forward toward the leading edge 46. In these embodiments, the internal cavity 64 may extend the entire chordwise length of the airfoil 40 to the leading edge 46 (i.e., open at the leading edge 46), or only a portion of that distance. In those present disclosure embodiments that include both a LE slot 56 and a TE slot 58, the internal cavity 64 may begin at the LE slot end surface 60 and extend to the TE slot end surface 62. In these embodiments, the internal cavity 64 may be formed by a single bore that extends between the LE slot end surface 60 and the TE slot end surface 62, or alternatively the internal cavity 64 may be produced by a pair of connecting bores, one extending from the LE slot end surface 60 and another extending from the TE slot end surface 62. In these embodiments, the internal cavity 64 is a single passage that extends completely between the LE slot end surface 60 to the TE slot end surface 62. In some embodiments, a test blade having a LE slot 56 and a TE slot 58 may include a first internal cavity 64 that begins at the LE slot end surface 60 and extends aft toward the trailing edge 48 and a second internal cavity 64 that begins at the TE slot end surface 62 and extends forward toward the leading edge 46. In these embodiments, the first and second internal cavities 64 do not connect with one another.

The internal cavity 64 (or internal cavities) are configured to receive a heating element 66 as will be described below. The internal cavity 64 (or internal cavities), the LE slot 56, and/or the TE slot 58 are also configured so that the airfoil 40 retains sufficient mechanical strength to permit the IBR 32 to be run at rotational speeds and loadings within the gas turbine engine 20 without failing for certification testing purposes; i.e., the test blade 34 is configured so that the test blade 34 will not be liberated until thermally compromised in the manner described herein. In preferred embodiments, the region of the test blade 34 containing the internal cavity 64 (or internal cavities) has a uniformly configured geometry in a direction between leading edge 46 and the trailing edge 48 so that the mechanical strength of the airfoil material retaining the airfoil is uniform; e.g., the material retaining the blade in this region is uniformly configured. The aforesaid uniform configuration is understood to result in a desirable uniform plane of liberation during the certification test.

Figure 6:
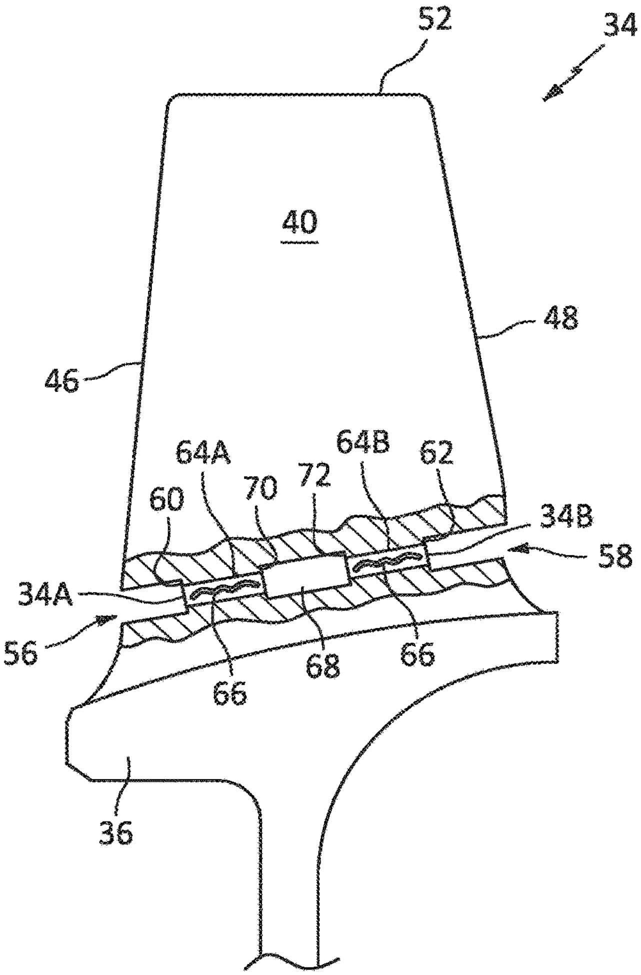
FIG. 6 is a diagrammatic planar side view of a rotor blade portion of an integrally bladed rotor illustrating an embodiment of the present disclosure.

The test blade shown in FIG. 6 illustrates another embodiment of the present disclosure. In this embodiment, the test blade includes a LE slot 56, a TE slot 58, and an interior slot 68 disposed between the LE slot 56 and the TE slot 58. The LE slot 56 is separated from the interior slot 68 by a first airfoil portion 34A and the TE slot 58 is separated from the interior slot 68 by a second airfoil portion 34B. The interior slot 68 has a chordwise length, a width (i.e., the distance between the suction side and pressure side surfaces 42, 44 of the airfoil 40), and a spanwise extending height. The length of the interior slot 68 extends between a first end surface 70 at the first airfoil portion 34A and a second end surface 72 at the second airfoil portion 34B. A first internal cavity 64A is disposed in the first airfoil portion 34A and a second internal cavity 64B is disposed in the second airfoil portion 34B. Similar to the internal cavity 64 described above and shown in FIGS. 4 and 5, the first internal cavity 64A extends through a portion or all of the first airfoil portion 34A and the second internal cavity 64B extends through a portion or all of the second airfoil portion 34B. The LE slot 56 is similar to that described above and shown in FIGS. 4 and 5. The LE slot 56 is a void formed in the test blade airfoil 40 disposed at the leading edge 46 of the airfoil 40 and extends a distance aft into the airfoil 40 towards the trailing edge 48; "open" at the leading edge 46 and extending between the suction side and pressure side surfaces 42, 44; has a chordwise length, a width, and a spanwise extending height; and includes a LE slot end surface 60, a top LE slot surface, and a bottom LE slot surface. The TE slot 58 is similar to that described above and shown in FIGS. 4 and 5. The TE slot 58 is a void formed in the test blade airfoil 40 disposed at the trailing edge 48 of the airfoil 40 and extends a distance forward into the airfoil 40 towards the leading edge 46; "open" at the trailing edge 48 and extending between the suction side and pressure side surfaces 42, 44; has a chordwise length, a width, and a spanwise extending height; and includes a TE slot end surface 62, a top TE slot surface, and a bottom TE slot surface.

The first and second internal cavities 64A, 64B are each configured to receive a heating element 66 as will be described below. The first and second airfoil portions 34A, 34B, the first and second internal cavities 64A, 64B, the interior slot 68, the LE slot 56, and/or the TE slot 58 are configured so that the airfoil 40 retains sufficient mechanical strength to permit the IBR 32 to be run at rotational speeds and loadings within the gas turbine engine 20 without failing for certification testing purposes; i.e., the test blade 34 is configured so that the test blade 34 will not be liberated until thermally compromised in the manner described herein. In preferred embodiments, the regions of the test blade 34 containing the first and second internal cavities 64A, 64B have uniformly configured geometries in a direction between leading edge 46 and the trailing edge 48 so that the mechanical strength of the airfoil material retaining the airfoil is uniform; e.g., the material retaining the blade in this region is uniformly configured. The aforesaid uniform configuration is understood to result in a desirable uniform plane of liberation during the certification test.

Figure 7:
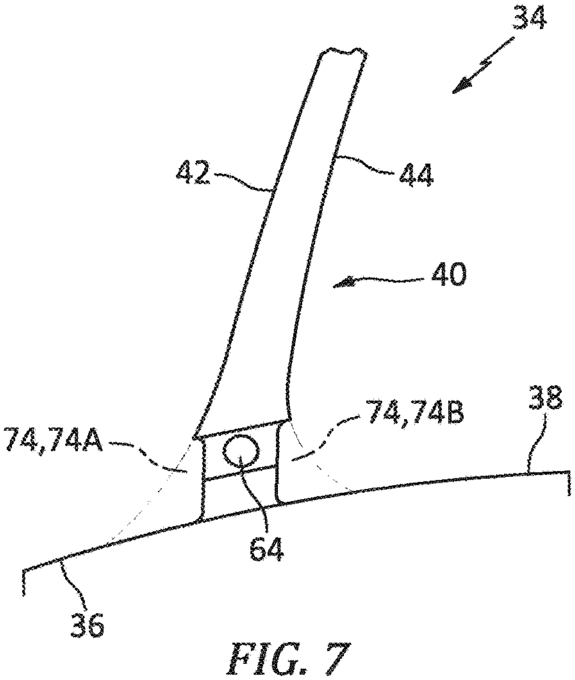
FIG. 7 is a diagrammatic planar front view of a rotor blade portion of an integrally bladed rotor illustrating an embodiment of the present disclosure.

Referring to FIG. 7, in some embodiments a present disclosure test blade may further include a lateral cavity 74 disposed in the airfoil 40 on the suction side of the airfoil 40, or the pressure side of the airfoil 40, or both. The lateral cavity 74 or cavities are generally aligned with the respective internal cavities 64; e.g., extending generally parallel to the internal cavity 64 between the leading edge 46 of the airfoil 40 and the trailing edge 48 of the airfoil 40. A lateral cavity 74 may have a variety of different geometric configurations, each producing a narrowing of the airfoil 40 material adjacent the respective internal cavities 64. The present disclosure is not limited to any particular lateral cavity 74 geometric configuration. Here again, the configuration of the test blade in the region containing the internal cavity and the lateral cavity(ies) 74 is preferably geometrically uniform so that the mechanical strength of the airfoil material retaining the airfoil is uniform to facilitate a desirable uniform plane of liberation during the certification test.

Figure 8:
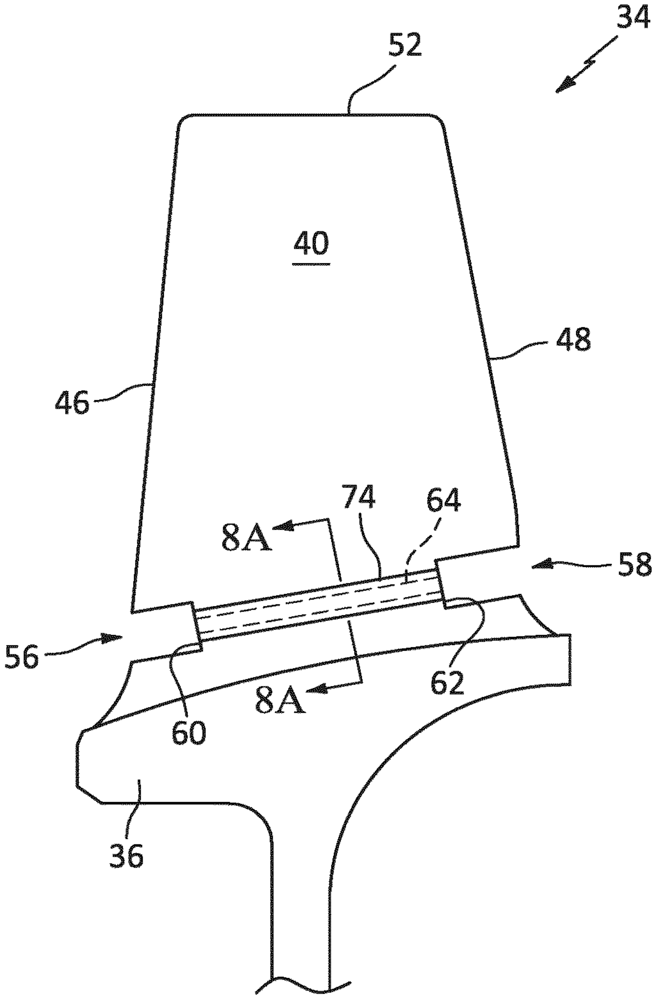
FIG. 8 is a diagrammatic planar side view of a rotor blade portion of an integrally bladed rotor illustrating an embodiment of the present disclosure.
Figure 8A:
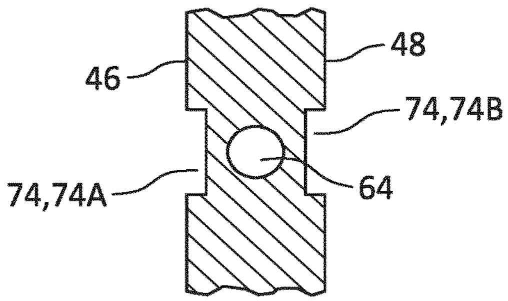
FIG. 8A is a diagrammatic partial sectional view of the rotor blade shown in FIG. 8 along sectional lines 8A-8A.

In the test blade embodiment shown in FIGS. 8 and 8A, the test blade includes a LE slot 56 and a TE slot 58 in the manner described above and shown in FIGS. 4 and 5. In this embodiment, a first lateral cavity 74A is disposed in the section of the airfoil 40 disposed between the LE slot 56 and the TE slot 58 on the suction side of the airfoil 40, and a second lateral cavity 74B is disposed in the section of the airfoil 40 disposed between the LE slot 56 and the TE slot 58 on the pressure side of the airfoil 40. The first and second lateral cavities 74A, 74B are aligned with the internal cavity 64 disposed within the section of the airfoil 40 disposed between the LE slot 56 and the TE slot 58. Alternatively, the test blade 34 may have either a first lateral cavity 74A disposed in the section of the airfoil 40 disposed on the suction side of the airfoil 40, or a second lateral cavity 74B disposed in the section of the airfoil 40 disposed on the pressure side of the airfoil 40. The LE slot 56, TE slot 58, internal cavity 64, first lateral cavity 74A, and/or the second lateral cavity 74B are configured so that the airfoil 40 retains sufficient mechanical strength to permit the IBR 32 to be run at rotational speeds and loadings within the gas turbine engine 20 without failing for certification testing purposes; i.e., the test blade 34 is configured so that the test blade 34 will not be liberated until thermally compromised in the manner described herein. In preferred embodiments, the region of the test blade 34 containing the internal cavity 64 (or internal cavities) and the lateral cavity 74 (or lateral cavities 74A, 74B) has a uniformly configured geometry in a direction between leading edge 46 and the trailing edge 48 so that the mechanical strength of the airfoil material retaining the airfoil is uniform; e.g., the material retaining the blade in this region is uniformly configured. The aforesaid uniform configuration is understood to result in a desirable uniform plane of liberation during the certification test. To illustrate further, an airfoil typically has a greater thickness between the suction side and pressure side surfaces 42, 44 mid-chord that it does closer to the trailing edge 48 or the leading edge. To produce a uniformly configured geometry in the region of the test blade 34 containing the internal cavity 64, the depth of the lateral cavity 74 may be greater at the mid-chord region than it is closer to the trailing edge 48 or the leading edge 46.

Figure 9:
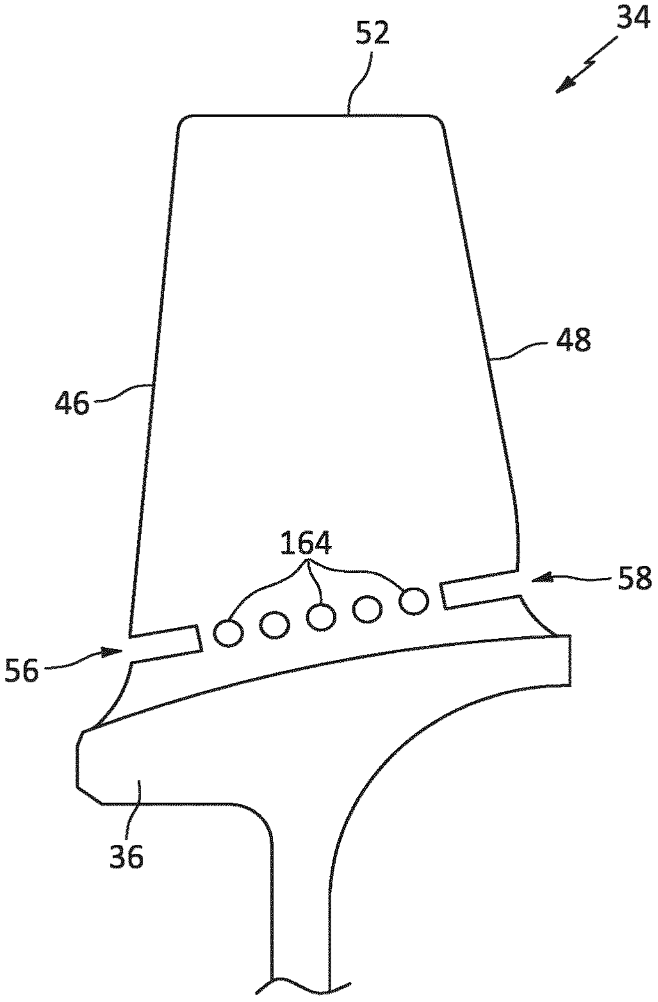
FIG. 9 is a diagrammatic planar side view of a rotor blade portion of an integrally bladed rotor illustrating an embodiment of the present disclosure.

The test blade shown in FIG. 9 illustrates another embodiment of the present disclosure. In this embodiment, the test blade includes a plurality of widthwise passages 164 extending between the suction side surface 42 and the pressure side surface. This embodiment may also include a LE slot 56, a TE slot 58, and may include a lateral cavity 74 (as described herein) disposed in the airfoil 40 on the suction side of the airfoil 40, or the pressure side of the airfoil 40, or both. The lateral cavity 74 or cavities may be generally aligned with the respective widthwise passages 164.

The internal cavities 64 are shown in the FIGURES as having a circular geometry. The present disclosure is not limited to an internal cavity 64 having a circular geometry; e.g., an internal cavity 64 may have another geometry such as an oval, or a slot, or the like.

In some embodiments, an IBR 32 having a test blade configuration as described above may include structure (e.g., similar internal cavities, lateral cavities, slots, etc.) on the opposite side of the IBR 32 (e.g., 180 degrees off set from the central passage and first and second lateral cavities) for rotational balance purposes.

The present disclosure includes one or more heating elements 66 configured to be disposed within an internal cavity 64 (widthwise passages 164) as described above. The one or more heating elements 66 are configured to selectively produce, upon activation, sufficient thermal energy for a period of time sufficient to increase the temperature of the IBR 32 material proximate the internal cavity 64 and thereby decrease the mechanical properties (e.g., tensile strength) of the IBR 32 material to a point where a portion of the rotor blade 34 will liberate under operation of the engine 20. An example of a heating element 66 type that may be used is an electrically powered device such as a heating rod or an induction heater. Another example of an acceptable heating element 66 type is a material that can be activated to produce an exothermic non-explosive reaction. A non-limiting example of an exothermic material that may be used is a magnesium and barium peroxide thermite material. The characteristics of the heating element 66 (e.g., type of electrical heater, type of exothermic material, amount of exothermic material, etc.) may vary depending on the application. For example, the geometry of the IBR 32 proximate the internal cavity 64 or internal cavities may influence the selection of the heating element 66. As another example, the type of IBR 32 material in the region of the central passage may influence the selection of the heating element 66. The IBR 32 is not limited to comprising any particular type of material. Examples of IBR 32 materials include titanium alloys, nickel alloys, composite materials, and the like. Different IBR 32 materials may have different mechanical properties as a function of temperature. As a result, the selection of the heating element 66 may vary depending upon the application. The present disclosure is not limited to any particular mechanism for providing initiating signals or power (e.g., electrical energy) to the one or more heating elements 66. For example, a slip ring or other electrically conductive mechanism may be used to provide electrical current/signal to the one or more heating elements 66.

The present disclosure provides numerous benefits relative to existing blade off systems and configuration. For example, the present disclosure does not use explosive material to liberate a rotor blade 34. Explosive materials are inherently dangerous. The present disclosure uses a heating element 66 that is non-explosive and thereby avoids the inherent danger of explosive materials. In addition, it is understood that using an explosive material to produce a fracture plane increases the uncertainty of where the fracture plane will be created. A blade off system and IBR 32 configuration that increases the consistency of the test for certification purposes is beneficial. As another example, the various present disclosure test blade configurations are designed to produce a known fracture plane. Knowing with substantial certainty where the test blade 34 will fracture during testing leads to desirable consistency. As yet another example, the present disclosure use of a heating element 66 provides predictability to the testing process While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An integrally bladed rotor for a gas turbine engine, the integrally bladed rotor configured for use in blade off testing, comprising:

a hub having a forward end, an aft end, a circumferentially extending exterior surface disposed between the forward end and the aft end;

a plurality of rotor blades integrally attached to the hub and circumferentially spaced around the hub, the plurality of rotor blades including a test blade, each rotor blade of the plurality of rotor blades extending radially out from the hub exterior surface, and each rotor blade of the plurality of rotor blades having an airfoil with a leading edge, a trailing edge, a suction side surface, a pressure side surface, a base end, and a width extending between the suction side surface and the pressure side surface, and each airfoil comprised of an airfoil material having one or more mechanical strength properties;

wherein the airfoil of the test blade includes at least one internal cavity extending in a lengthwise direction, the internal cavity disposed adjacent the base end of the airfoil, and at least one lateral cavity disposed adjacent and aligned with the at least one internal cavity, wherein the width of the airfoil is decreased at the at least one lateral cavity; and at least one heating element disposed in the at least one internal cavity, wherein the at least one heating element is configured to selectively produce an amount of thermal energy sufficient to heat the airfoil material proximate the internal cavity from a first temperature to a second temperature and at the second temperature the one or more mechanical strength properties of the airfoil material proximate the internal cavity are decreased.

2. The integrally bladed rotor of claim 1, wherein the at least one heating element is electrically powered.

3. The integrally bladed rotor of claim 1, wherein the at least one heating element is an exothermic material.

4. The integrally bladed rotor of claim 1, wherein the integrally bladed rotor is configured for use in a compressor section of the gas turbine engine.

5. The integrally bladed rotor of claim 1, wherein the integrally bladed rotor is configured for use in a fan section of the gas turbine engine.

6. The integrally bladed rotor of claim 1, wherein the at least one lateral cavity includes a first lateral cavity disposed on a first circumferential side of the airfoil and a second lateral cavity disposed on a second circumferential side of the airfoil, wherein the first circumferential side of the airfoil is opposite the second circumferential side of the airfoil.

7. The integrally bladed rotor of claim 6, wherein the first lateral cavity and the second lateral cavity are spanwise aligned with the at least one internal cavity.

8. A method for performing blade off testing on an integrally bladed rotor for a gas turbine engine, comprising:
providing an integrally bladed rotor having:
a hub having a forward end, an aft end, a circumferentially extending exterior surface disposed between the forward end and the aft end;
a plurality of rotor blades integrally attached to the hub and circumferentially spaced around the hub, the plurality of rotor blades including a test blade, each rotor blade of the plurality of rotor blades extending radially out from the hub exterior surface, and each rotor blade of the plurality of rotor blades having an airfoil with a leading edge, a trailing edge, a suction side surface, a pressure side surface, a base end, and a width extending between the suction side surface and the pressure side surface, and each airfoil comprised of an airfoil material having one or more mechanical strength properties;
wherein the airfoil of the test blade includes at least one slot defining a void in the airfoil, and at least one internal cavity disposed within the airfoil, wherein the at least one slot and the at least one internal cavity are disposed adjacent the base end of the airfoil and aligned with one another;
disposing at least one heating element disposed in the at least one internal cavity, wherein the at least one heating element is configured to selectively produce an amount of thermal energy sufficient to heat the airfoil material proximate the internal cavity from a first temperature to a second temperature and at the second temperature the one or more mechanical strength properties of the airfoil material proximate the internal cavity are decreased;
operating the gas turbine engine to test operating conditions; and
selectively operating the at least one heating element to produce the amount of thermal energy sufficient to heat the airfoil material proximate the internal cavity from the first temperature to the second temperature to cause the test blade to be liberated from the integrally bladed rotor.

9. The method of claim 8, wherein at the second temperature the one or more mechanical strength properties of the airfoil material proximate the internal cavity are decreased to a point where the airfoil material proximate the internal cavity will fail during a blade off test.

10. The method of claim 8, wherein the integrally bladed rotor is configured for use in a compressor section of the gas turbine engine.

11. The method of claim 8, wherein the integrally bladed rotor is configured for use in a fan section of the gas turbine engine.

12. The method of claim 8, wherein the at least one heating element is electrically powered.

13. The method of claim 8, wherein the at least one heating element is an exothermic material.

14. The method of claim 8, wherein the at least one slot includes a first lateral cavity disposed on a first circumferential side of the airfoil, wherein the width of the airfoil is decreased at the first lateral cavity.

15. The method of claim 14, wherein the at least one slot includes a second lateral cavity disposed on a second circumferential side of the airfoil, wherein the first circumferential side of the airfoil is opposite the second circumferential side of the airfoil.

16. The method of claim 15, wherein the first lateral cavity and the second lateral cavity are spanwise aligned with the at least one internal cavity.

17. The method of claim 16, wherein the first lateral cavity and the second lateral cavity are lengthwise aligned with the at least one internal cavity.

18. An integrally bladed rotor for a gas turbine engine, the integrally bladed rotor configured for use in blade off testing, comprising:
a hub having a forward end, an aft end, a circumferentially extending exterior surface disposed between the forward end and the aft end;
a plurality of rotor blades integrally attached to the hub and circumferentially spaced around the hub, the plurality of rotor blades including a test blade, each rotor blade of the plurality of rotor blades extending radially out from the hub exterior surface, and each rotor blade of the plurality of rotor blades having an airfoil with a leading edge, a trailing edge, a suction side surface, a pressure side surface, a base end, and a width extending between the suction side surface and the pressure side surface, and each airfoil comprised of an airfoil material having one or more mechanical strength properties;
wherein the airfoil of the test blade includes at least one slot defining a void in the airfoil, the at least one slot extending a lengthwise distance into the airfoil along a direction generally between the leading edge and trailing edge of the airfoil, the at least one slot terminating at a slot end surface, and at least one internal cavity extending lengthwise from the slot end surface; and
at least one heating element disposed in the at least one internal cavity, wherein the at least one heating element is configured to selectively produce an amount of thermal energy sufficient to heat the airfoil material proximate the internal cavity from a first temperature to a second temperature and at the second temperature the one or more mechanical strength properties of the airfoil material proximate the internal cavity are decreased.

19. The integrally bladed rotor for a gas turbine engine of claim 18, wherein the integrally bladed rotor is configured for use in a compressor section of the gas turbine engine.

20. The integrally bladed rotor for a gas turbine engine of claim 18, wherein the integrally bladed rotor is configured for use in a fan section of the gas turbine engine.

* * * * *